(12) United States Patent
Ho (10) Patent No.: US 11,522,987 B2
(45) Date of Patent: Dec. 6, 2022

(54) MOBILE DEVICE WITH ADJUSTABLE SUPPORTING MECHANISM

(71) Applicant: Oxti Corporation, Taipei (TW)

(72) Inventor: Chih Feng Ho, Taipei (TW)

(73) Assignee: OXTI CORPORATION, Taipei (TW)

( * ) Notice: Subject to any disclaimer, the term of this patent is extended or adjusted under 35 U.S.C. 154(b) by 279 days.

(21) Appl. No.: 16/898,481

(22) Filed: Jun. 11, 2020

(65) Prior Publication Data

US 2021/0392217 A1    Dec. 16, 2021

(51) Int. Cl.
| | | |
|---|---|---|
| *H04M 1/04* | (2006.01) | |
| *F16M 11/38* | (2006.01) | |
| *F16M 13/02* | (2006.01) | |
| *F16M 11/04* | (2006.01) | |

(52) U.S. Cl.
CPC .............. *H04M 1/04* (2013.01); *F16M 11/04* (2013.01); *F16M 11/38* (2013.01); *F16M 13/022* (2013.01)

(58) Field of Classification Search
CPC ...... F16M 11/10; F16M 11/046; F16M 11/38; H04M 1/04
See application file for complete search history.

(56) References Cited

U.S. PATENT DOCUMENTS

| | | | | |
|---|---|---|---|---|
| 5,765,797 A * | 6/1998 | Greene | .............. | A47B 21/0314 248/398 |
| 7,639,483 B2 * | 12/2009 | Chen | .................. | F16M 11/2021 361/679.22 |
| 8,328,153 B2 * | 12/2012 | Yang | ...................... | F16M 11/10 248/370 |
| 8,960,104 B2 * | 2/2015 | Copeland | ................. | A47B 9/00 108/5 |
| 8,985,684 B2 * | 3/2015 | Zheng | ................ | B64D 11/0638 297/161 |
| 9,377,156 B2 * | 6/2016 | Wong | .................. | F16M 11/2092 |
| 9,470,356 B1 * | 10/2016 | Zaloom | .................. | F16M 11/42 |
| 9,483,083 B1 * | 11/2016 | Zaloom | ................. | G06F 3/0208 |
| 10,198,720 B2 | 2/2019 | Shi et al. | | |
| 10,344,914 B2 * | 7/2019 | Cardozo | ................. | F16H 19/04 |
| 10,571,068 B2 | 2/2020 | Law et al. | | |
| 10,623,543 B2 | 4/2020 | Hummel et al. | | |
| 10,851,938 B2 * | 12/2020 | Glickstein | .......... | F16M 11/2014 |
| 10,865,934 B2 * | 12/2020 | Kwasniewski | ....... | F16M 11/041 |
| 10,880,423 B2 * | 12/2020 | Ajani | .................... | F16M 11/041 |
| 10,890,944 B1 * | 1/2021 | Tien | ....................... | G06F 1/1666 |
| 10,895,345 B2 * | 1/2021 | Lederer | .................. | F16M 13/00 |
| 11,106,117 B2 * | 8/2021 | Hong | ................... | F16M 11/041 |

(Continued)

*Primary Examiner* — Bradley Duckworth
(74) *Attorney, Agent, or Firm* — Browdy and Neimark, PLLC (57) ABSTRACT

A mobile device supporting assembly includes a supporting mechanism having a base plate, a carrier plate to be supported on the base plate, and a lever attached to the base plate and adjustable relative to the base plate, and a mobile electronic facility to be supported on the carrier plate. The carrier plate is adjustable relative to the base plate with the lever for allowing the mobile electronic facility to be adjusted relative to the base plate to any suitable or selected height. The lever includes a spindle engaged with the base plate for pivotally attaching the lever to the base plate, and includes an axle engaged with the carrier plate for pivotally attaching the lever to the carrier plate.

8 Claims, 7 Drawing Sheets

(56) References Cited

U.S. PATENT DOCUMENTS

| | | | |
|---|---|---|---|
| 2006/0157627 A1* | 7/2006 | Hung | F16M 11/10 |
| | | | 248/231.71 |
| 2007/0012825 A1* | 1/2007 | Yeh | F16M 11/105 |
| | | | 248/122.1 |
| 2012/0193488 A1* | 8/2012 | Chung | F16M 13/00 |
| | | | 248/201 |
| 2012/0327566 A1* | 12/2012 | Pennington, Jr. | F16M 11/2021 |
| | | | 361/679.01 |
| 2013/0009023 A1* | 1/2013 | Chen | H01Q 3/04 |
| | | | 248/125.8 |
| 2021/0003244 A1* | 1/2021 | Bowman | F16M 13/005 |
| 2021/0240058 A1* | 8/2021 | Lee | F16M 11/041 |
| 2021/0247016 A1* | 8/2021 | Affentranger | F16M 11/2014 |
| 2021/0353051 A1* | 11/2021 | Phifer | F16M 13/00 |

\* cited by examiner

MOBILE DEVICE WITH ADJUSTABLE SUPPORTING MECHANISM

BACKGROUND OF THE INVENTION

1. Field of the Invention

The present invention relates to an audio-video equipment or mobile device, and more particularly to an audio-video equipment or mobile device with an adjustable supporting arm or mechanism or assembly or the like for supporting the audio-video equipment or mobile device at a suitable or selected height or position for allowing the audio-video equipment or mobile device to be easily seen or viewed by the user.

2. Description of the Prior Art

Typical audio-visual or audio-video equipment or facilities comprise a speaker housing, a mobile electronic device, such as a portable or mobile phone, a notebook, a microcomputer, a personal computer, a screen, a displayer, a projector, or the like to be disposed or supported on the table or stand or the like.

For example, U.S. Pat. No. 10,198,720 B2 to Shi et al., U.S. Pat. No. 10,571,068 B2 to Law et al., and U.S. Pat. No. 10,623,543 B2 to Hummel et al. disclose several of the typical audio-visual or audio-video facilities having a supporting stand for supporting the audio-video equipment or mobile device at a suitable or selected height or position.

However, the supporting stand may not be used to suitably support the audio-video equipment or mobile device at a suitable or selected height or position and may not be easily seen or viewed by the user.

The present invention has arisen to mitigate and/or obviate the afore-described disadvantages of the conventional audio-video or mobile devices.

SUMMARY OF THE INVENTION

The primary objective of the present invention is to provide an audio-video equipment or mobile device including an adjustable supporting arm or mechanism or the like for supporting the audio-video equipment or mobile device at a suitable or selected height or position for allowing the audio-video equipment or mobile device to be easily seen or viewed by the user.

In accordance with one aspect of the invention, there is provided a mobile device supporting assembly comprising a supporting mechanism including a base plate, a carrier plate to be supported on the base plate, and a lever attached to the base plate and adjustable relative to the base plate, and a mobile electronic facility to be supported on the carrier plate for allowing the mobile electronic facility to be adjusted relative to the base plate to any suitable or selected height and for allowing the mobile electronic facility to be easily and readily viewed or seen by the user or the like.

The lever includes a first end portion having a spindle engaged with the base plate for pivotally and adjustably attaching the lever to the base plate. The lever includes a plurality of first teeth formed on the spindle, and the base plate includes a plurality of second teeth engaged with the first teeth of the lever for frictionally adjusting the lever relative to the base plate and for allowing the lever to be frictionally anchored and positioned to the base plate at the selected or required height.

The base plate includes a barrel having the second teeth formed in the barrel, and/or the base plate includes two barrels each having the second teeth formed in the barrel. The lever includes a second end portion having an axle engaged with the carrier plate for pivotally attaching the lever to the carrier plate and for allowing the carrier plate to be adjusted relative to the base plate to any suitable or selected height.

The lever includes a plurality of first teeth formed on the axle, and the carrier plate includes a plurality of second teeth engaged with the first teeth of the lever for frictionally adjusting the lever relative to the carrier plate. The carrier plate includes a barrel having the second teeth formed in the barrel, and/or the carrier plate includes two barrels each having the second teeth formed in the barrel and engaged with the first teeth of the lever.

A supporting stand may further be provided and includes a base board, a carrier board, and a post disposed and engaged with the base board and the carrier board for supporting the carrier board above the base board at any suitable or selected height. The post includes a rod, and the base board includes an opening formed in the base board for receiving and engaging with the rod of the post. The base board includes a sucker attached to a bottom portion of the base board.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
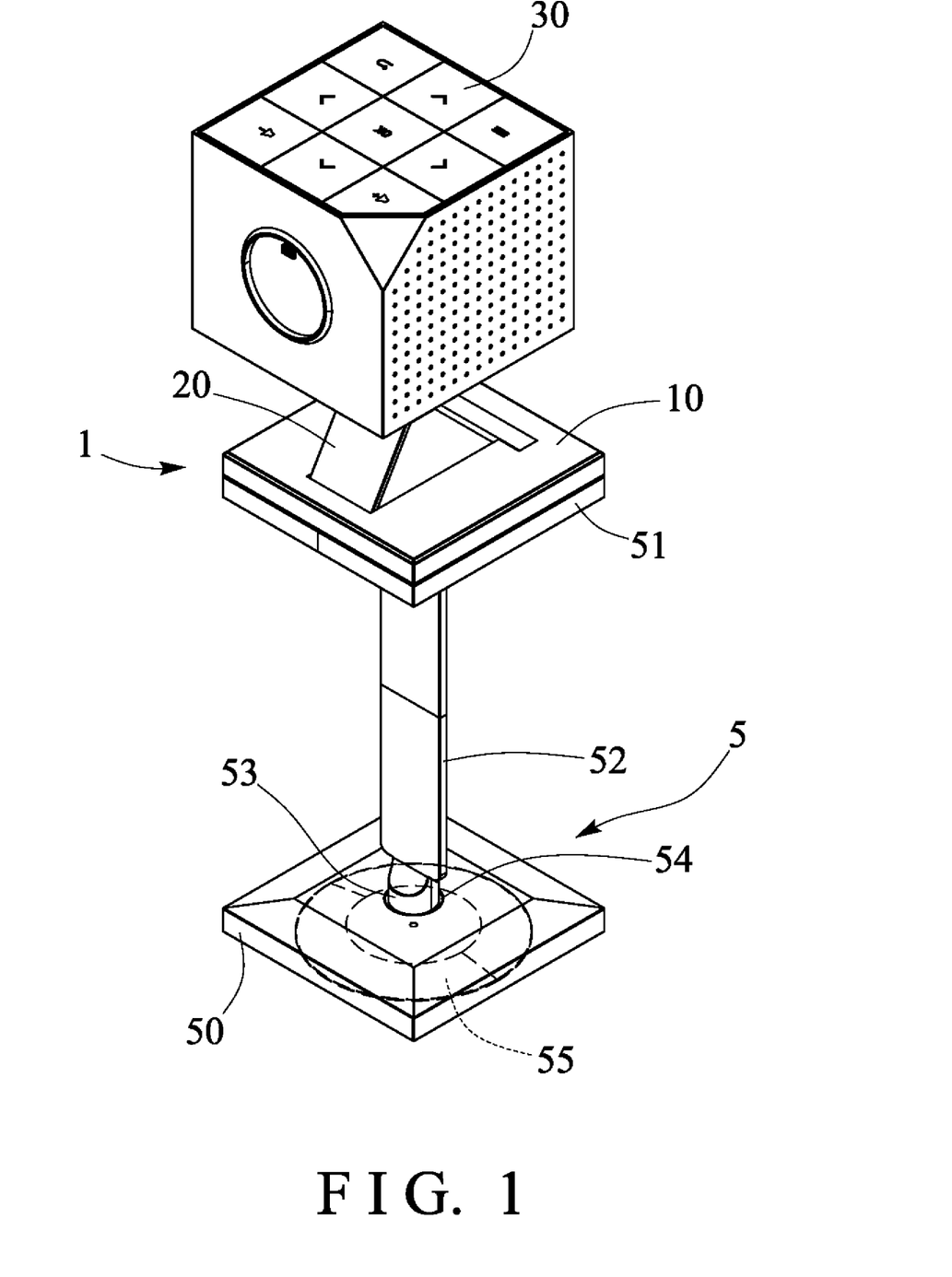
FIG. 1 is a perspective view of a mobile device supporting mechanism or assembly in accordance with the present invention.
Figure 2:
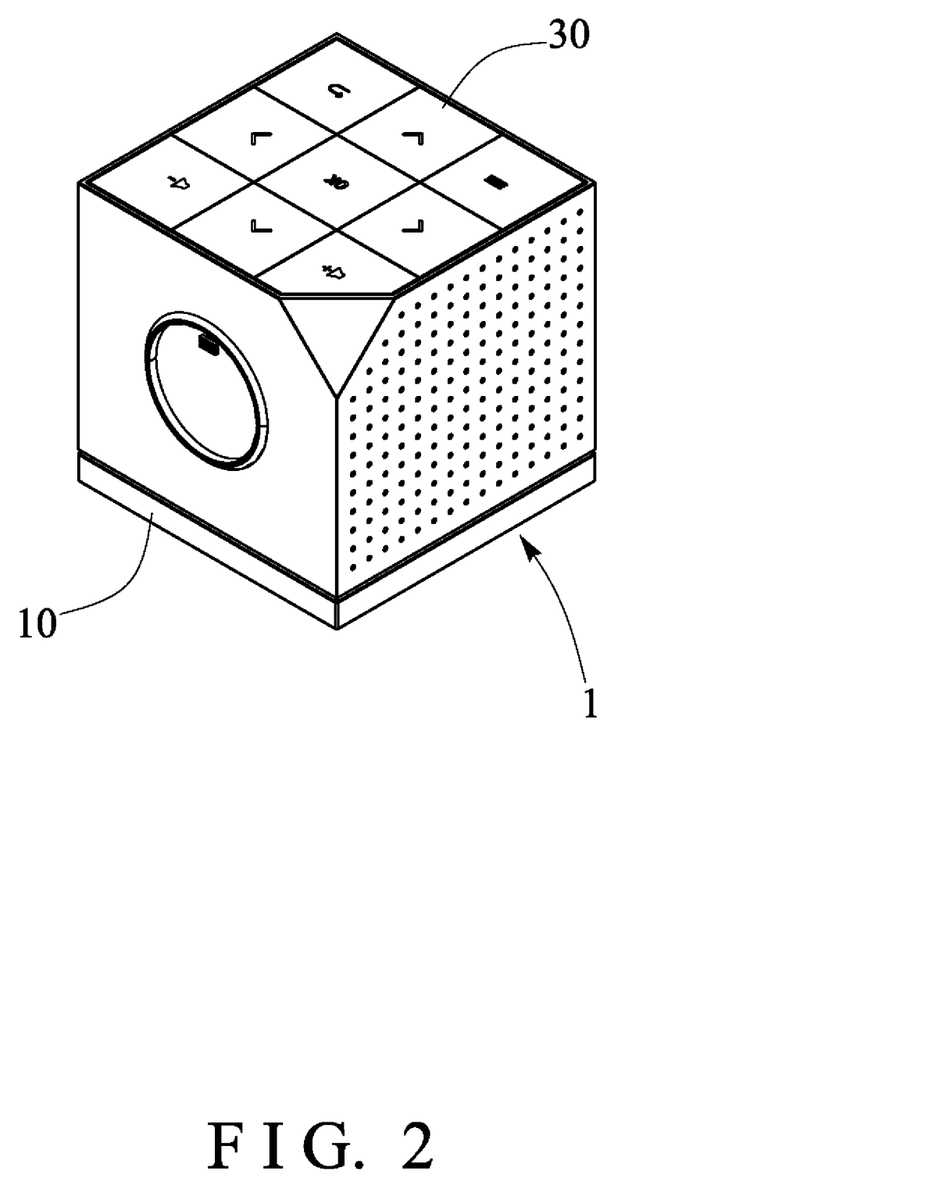
FIG. 2 is a partial perspective view illustrating an audio-video equipment or mobile facility of the mobile device supporting mechanism or assembly.
Figure 3:
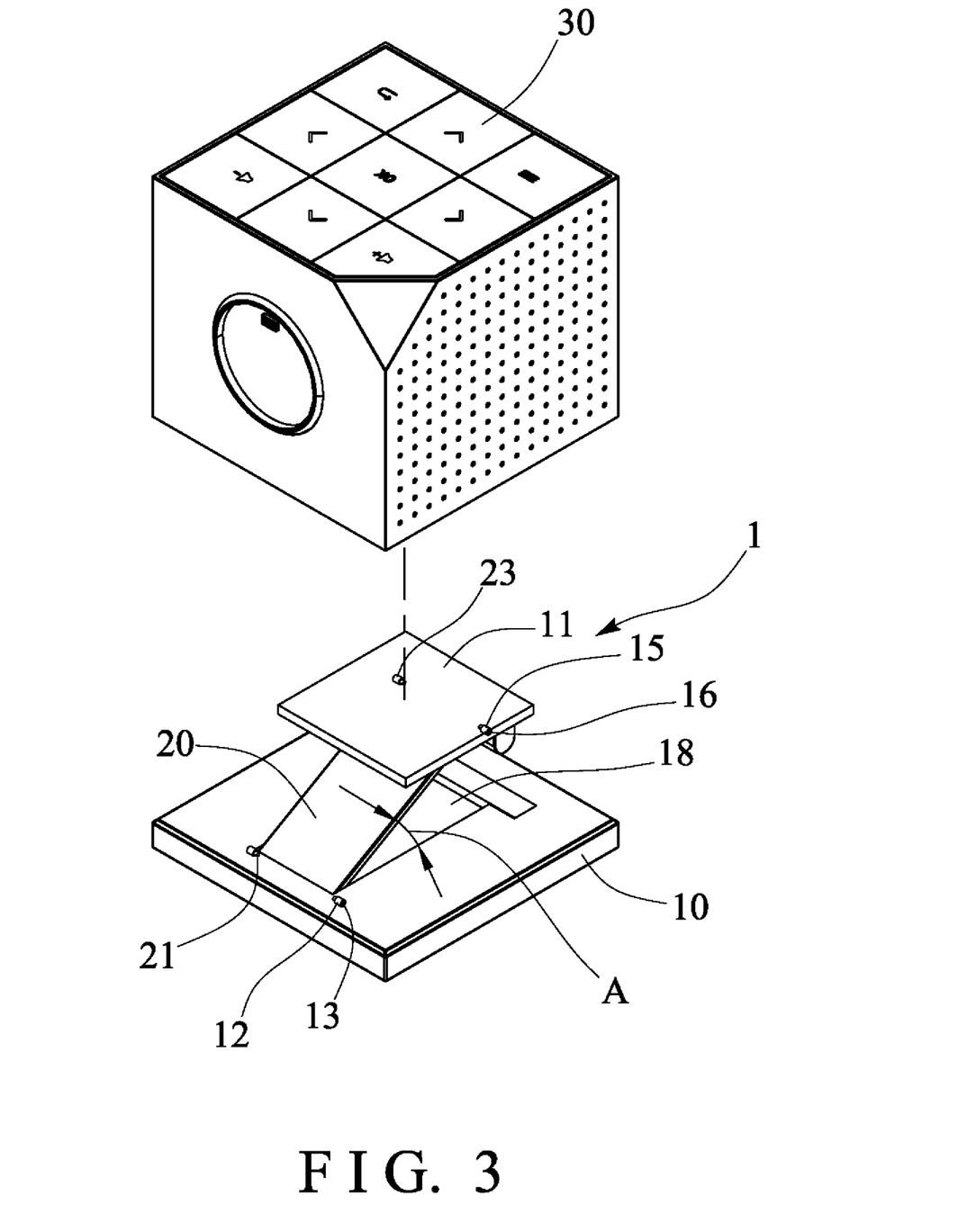
FIG. 3 is a partial exploded view of the audio-video equipment or mobile facility of the mobile device supporting mechanism or assembly.

Referring to the drawings, and initially to FIGS. 1-3, a mobile device supporting mechanism or assembly in accordance with the present invention comprises an adjustable supporting arm or mechanism 1 including a base plate 10 to be supported on a carrier or supporting stand 5 (FIGS. 1, 7), a supporting surface or the like, and a carrier plate 11 to be adjustably supported on the base plate 10 with a supporting arm or lever 20, and to be movable or adjustable up and down relative to the base plate 10. The carrier plate 11 may be provided for disposing or supporting or carrying a mobile device, a mobile electronic device, or a mobile facility 30, such as a portable or mobile phone, a notebook, a microcomputer, a personal computer, a screen, a displayer, a projector, or the like.

Figure 4:
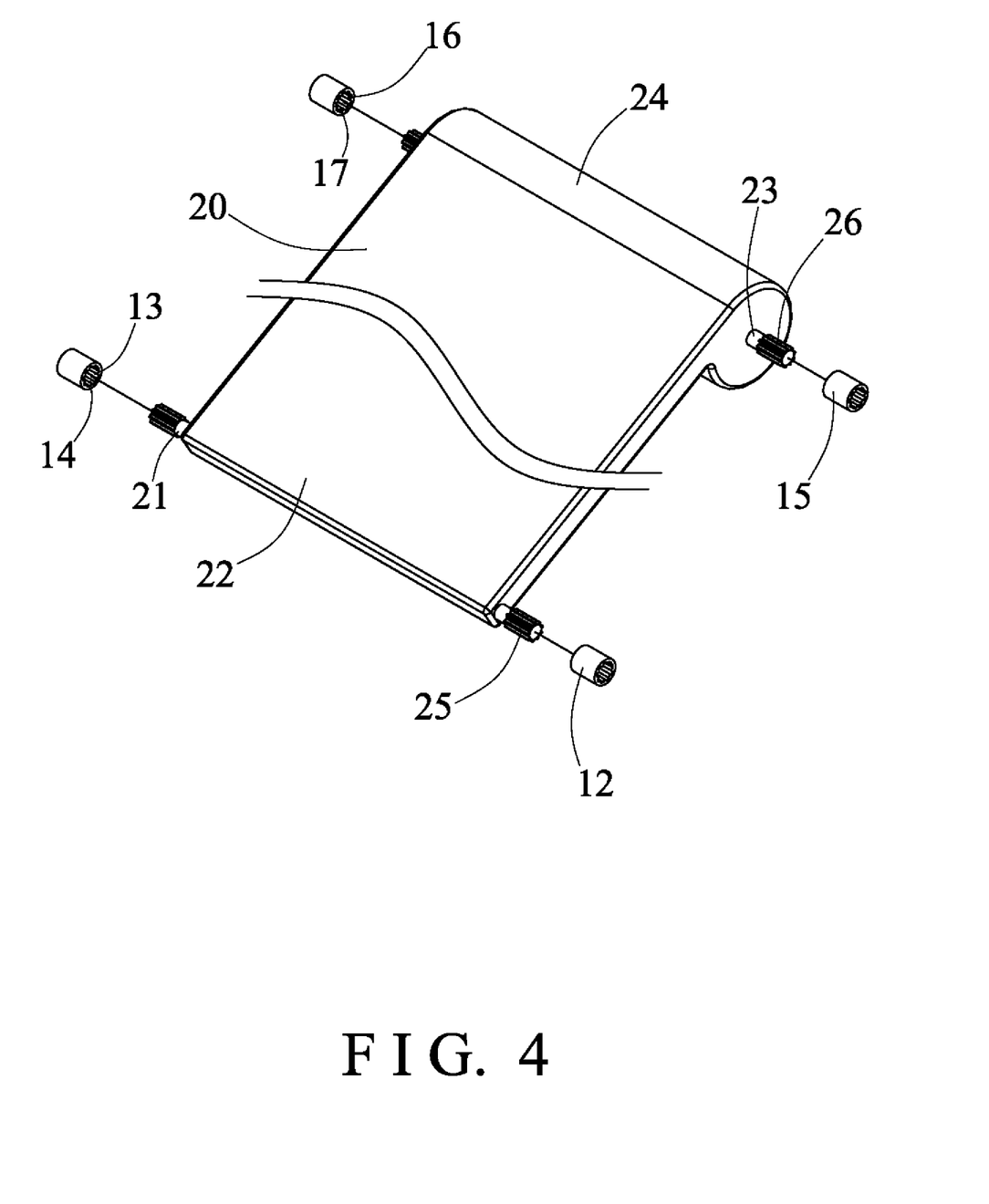
FIG. 4 is another partial exploded view of the supporting mechanism or assembly for the audio-video equipment or mobile facility.

As shown in FIGS. 3 and 4, the lever 20 includes a shaft or spindle 21 provided or disposed or engaged in the one or first end portion or the lower or bottom portion 22 thereof for pivotally or rotatably attaching or connecting or coupling to the base plate 10, and a shaft or axle 23 provided or disposed or engaged in the other or second end portion or the upper portion 24 of the lever 20 for pivotally or rotatably attaching or connecting or coupling to the carrier plate 11 and for allowing the carrier plate 11 to be adjustably supported on the base plate 10.

The spindle 21 includes two end portions each having a number of teeth 25 formed or provided thereon, and the axle 23 also includes two end portions each having a number of teeth 26 formed or provided thereon. The base plate 10 includes one or more (such as two) tubes or barrels 12 disposed or engaged therein, and the barrels 12 each include a hole or bore 13 formed therein for receiving or engaging with the spindle 21 and for pivotally or rotatably securing or connecting or coupling the lever 20 to the base plate 10.

Figure 5:
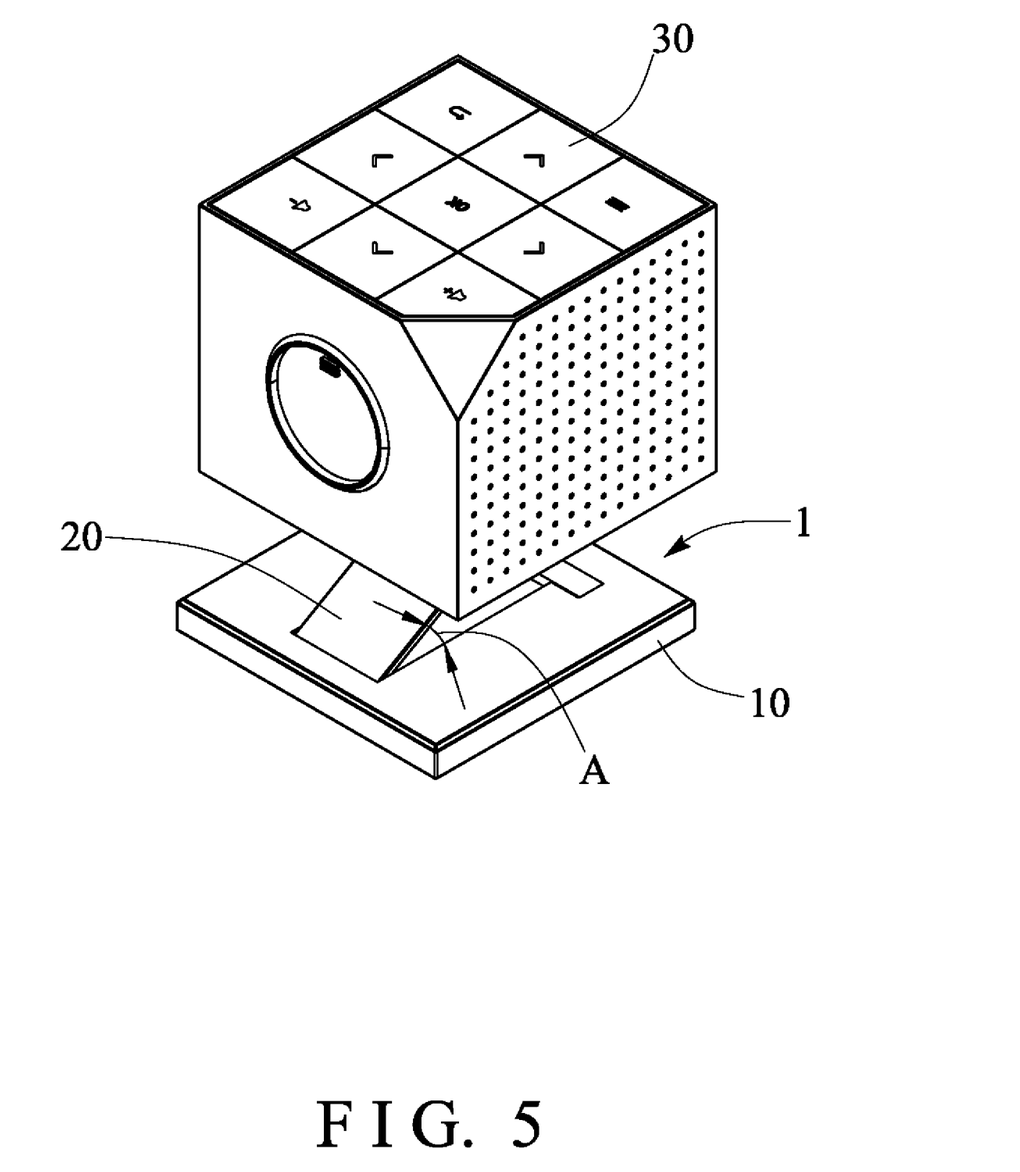
FIGS. 5, 6 are further perspective views similar to FIG. 2, illustrating the operation of the audio-video equipment or mobile facility.
Figure 6:
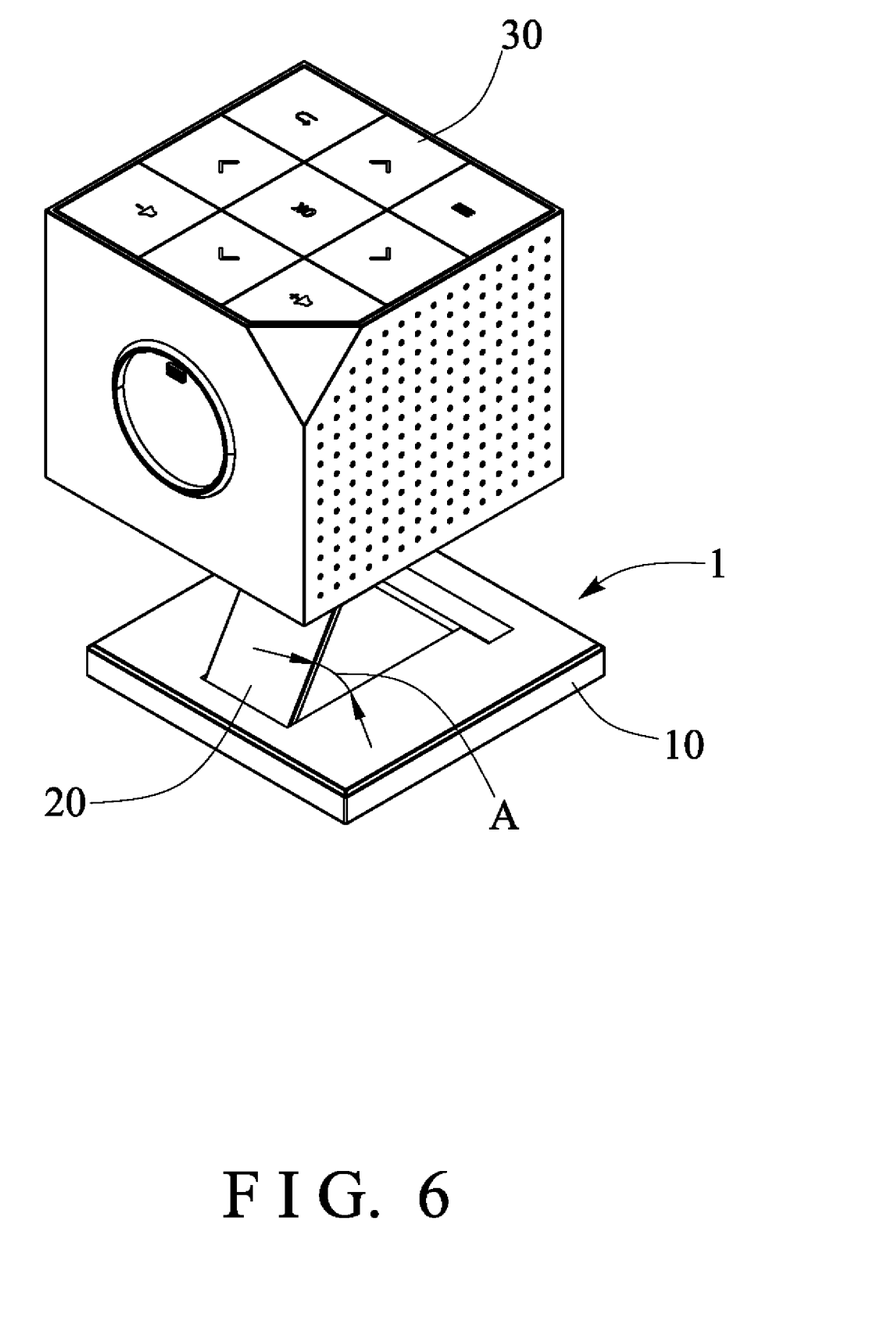

It is preferable that the barrels 12 each include a number of teeth 14 formed or provided in the bore 13 thereof for engaging with the teeth 25 of the spindle 21 and for allowing the lever 20 to be adjusted relative to the base plate 10 to any suitable or selected angular position or to any suitable or selected included angle (A) (FIGS. 3, 5, 6). For example, the lever 20 may be frictionally adjusted and supported relative to the base plate 10 at any suitable or selected angular position with the frictional force between the teeth 25 of the spindle 21 and the teeth 14 of the barrels 12.

Similarly, the carrier plate 11 also includes one or more (such as two) tubes or sleeves 15 disposed or engaged therein, and the sleeves 15 each include a bore or hole 16 formed therein for receiving or engaging with the axle 23 and for pivotally or rotatably securing or connecting or coupling the lever 20 to the carrier plate 11. It is also preferable that the sleeves 15 each include a number of teeth 17 formed or provided in the hole 16 thereof for engaging with the teeth 26 of the axle 23 and for allowing the lever 20 to be adjusted relative to the carrier plate 11 to any suitable or selected angular position or to any suitable or selected included angle. For example, the lever 20 may be adjusted and supported relative to the carrier plate 11 at any suitable or selected angular position with the frictional force between the teeth 26 of the axle 23 and the teeth 17 of the sleeves 15.

Figure 7:
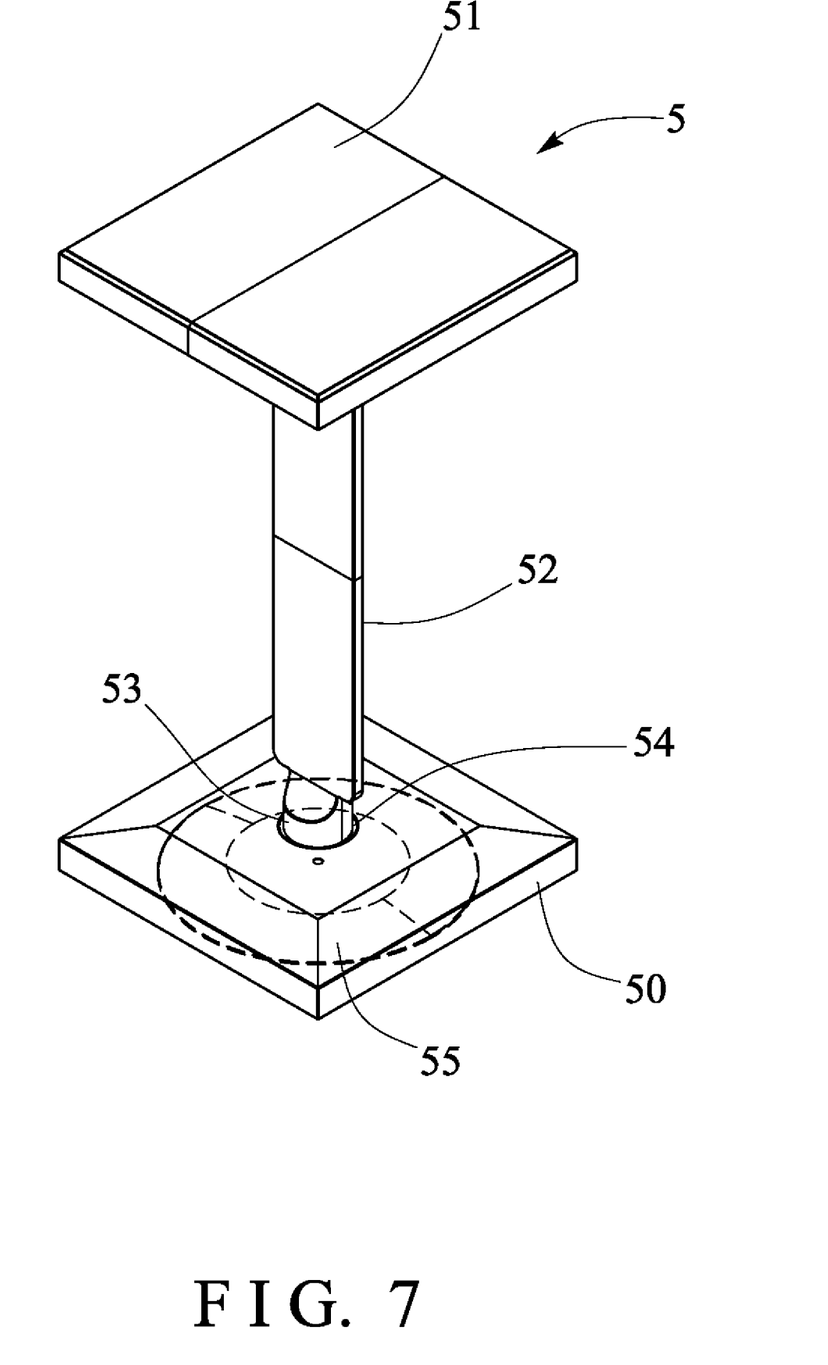
FIG. 7 is a still further perspective view illustrating the supporting arm or mechanism of the mobile device supporting mechanism or assembly.

As shown in FIGS. 1 and 7, the carrier or supporting stand 5 of the mobile device supporting assembly includes a base board 50 to be supported on a supporting desk, a supporting surface (not illustrated) or the like, and a carrier board 51 to be supported on the base board 50 with a supporting column or post 52, for supporting the adjustable supporting mechanism 1 on the carrier board 51 (FIG. 1). The post 52 includes a tubular or cylindrical tube or rod 53 formed or provided on the lower or bottom portion thereof, and the base board 50 includes an orifice or opening 54 formed therein for receiving or engaging with the rod 53 of the post 52 and for allowing the post 52 to be pivoted or rotated or adjusted relative to the base board 50.

It is preferable that the base board 50 includes a sucker or suction device 55 disposed or engaged in the lower or bottom portion thereof for engaging with the supporting desk or the supporting surface (not illustrated) or the like, and for allowing the supporting stand 5 to be firmly and solidly and stably supported on the supporting desk or the supporting surface (not illustrated) or the like. It is also preferable that the post 52 may be tilted or inclined relative to the base board 50 for allowing the mobile facility 30 to be suitably and selectively tilted or inclined relative to the base board 50, when required.

Accordingly, the audio-video equipment or mobile device in accordance with the present invention includes an adjustable supporting arm or mechanism or the like for supporting the audio-video equipment or mobile device at a suitable or selected height or position for allowing the audio-video equipment or mobile device to be easily seen or viewed by the user.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mobile device supporting assembly comprising:
a supporting mechanism including a base plate, a carrier plate to be supported on said base plate, and a lever attached to said base plate and adjustable relative to said base plate, said lever including a first end portion having a spindle engaged with said base plate for pivotally attaching said lever to said base plate, said lever including a plurality of first teeth formed on said spindle,
said base plate including a plurality of second teeth engaged with said first teeth of said lever for frictionally adjusting said lever relative to said base plate, and said base plate including two barrels each having said second teeth formed in said barrel, and
a mobile electronic facility to be supported on said carrier plate.

2. The mobile device supporting assembly as claimed in claim 1, wherein said lever includes a second end portion having an axle engaged with said carrier plate for pivotally attaching said lever to said carrier plate.

3. The mobile device supporting assembly as claimed in claim 2, wherein said lever includes a plurality of third teeth formed on said axle, and said carrier plate includes a plurality of fourth teeth engaged with said third teeth of said lever for frictionally adjusting said lever relative to said carrier plate.

4. The mobile device supporting assembly as claimed in claim 3, wherein said carrier plate includes a barrel having said fourth teeth formed in said barrel.

5. The mobile device supporting assembly as claimed in claim 1 further comprising a supporting stand including a base board, a carrier board, and a post disposed and engaged with said base board and said carrier board, said base plate being supported on said carrier board of said supporting stand.

6. The mobile device supporting assembly as claimed in claim 5, wherein said post includes a rod, and said base board includes an opening formed in said base board for receiving and engaging with said rod of said post.

7. The mobile device supporting assembly as claimed in claim 5, wherein said base board includes a sucker attached to a bottom portion of said base board.

8. A mobile device supporting assembly comprising:
a supporting mechanism including a base plate, a carrier plate to be supported on said base plate, and a lever attached to said base plate and adjustable relative to said base plate, said lever including a first end portion and a second end portion, an axle provided on said second end portion of said lever and engaged with said carrier plate for pivotally attaching said lever to said carrier plate, said lever including a plurality of first teeth formed on said axle, and said carrier plate including a plurality of second teeth engaged with said first teeth of said lever for frictionally adjusting said lever relative to said carrier plate, and a mobile electronic facility to be supported on said carrier plate, wherein said carrier plate includes two barrels each having said second teeth formed in said barrel.

\* \* \* \* \*